US008973400B2

(12) United States Patent
Charbonneau et al.

(10) Patent No.: US 8,973,400 B2
(45) Date of Patent: Mar. 10, 2015

(54) METHODS OF USING A SUBMERGED COMBUSTION MELTER TO PRODUCE GLASS PRODUCTS

(75) Inventors: Mark William Charbonneau, Lakewood, CO (US); Bryan Keith Nesti, Hoschton, GA (US)

(73) Assignee: Johns Manville, Denver, CO (US)

( * ) Notice: Subject to any disclaimer, the term of this patent is extended or adjusted under 35 U.S.C. 154(b) by 1 day.

(21) Appl. No.: 13/268,065

(22) Filed: Oct. 7, 2011

(65) Prior Publication Data

US 2013/0086952 A1    Apr. 11, 2013

(51) Int. Cl.
*C03B 5/04* (2006.01)
*C03B 5/235* (2006.01)
*C03B 37/06* (2006.01)
*C03B 37/07* (2006.01)
*C03B 5/24* (2006.01)
*C03B 19/08* (2006.01)
*C03B 37/02* (2006.01)

(52) U.S. Cl.
CPC ............... *C03B 5/2356* (2013.01); *C03B 37/06* (2013.01); *C03B 37/07* (2013.01); *C03B 5/24* (2013.01); *C03B 19/08* (2013.01); *C03B 37/02* (2013.01)
USPC .............. 65/29.12; 65/134.5; 65/335; 65/337

(58) Field of Classification Search
CPC ........ C03B 5/2356; C03B 5/24; C03B 37/06; C03B 37/07; C03B 37/02
USPC .............................. 65/376–384, 29.12–32.21, 65/134.1–136.3; 73/23.31–23.33
See application file for complete search history.

(56) References Cited

U.S. PATENT DOCUMENTS

| 1,716,433 | A | 6/1929 | Ellis |
| 2,174,533 | A | 10/1939 | See et al. |
| 2,118,479 | A | 1/1940 | McCaskey |
| 2,269,459 | A | 1/1942 | Kleist |
| 2,432,942 | A | 12/1947 | See et al. |
| 2,679,749 | A | 6/1954 | Poole |
| 2,718,096 | A | 9/1955 | Henry et al. |
| 2,773,545 | A | 12/1956 | Petersen |

(Continued)

FOREIGN PATENT DOCUMENTS

| DE | 196 19 919 A1 | 8/1997 |
| DE | 100 29 983 C2 | 9/2003 |

(Continued)

OTHER PUBLICATIONS

Mert et al. "A new method to determine viscosity of liquids using vibration principles" Springer-Verlag 2003 as viewed at http://link.springer.com/content/pdf/10.1007%2Fs00397-003-0308-9 on Jan. 14, 2013.*

(Continued)

*Primary Examiner* — Jodi C Franklin
(74) *Attorney, Agent, or Firm* — Robert D. Touslee (57) ABSTRACT

A method comprises flowing an oxidant and a fuel into a submerged combustion burner in a glass tank furnace, the glass tank furnace receiving a feed of glass forming material and producing molten glass, the burner and furnace comprising a melting system. The melting system has a variable system vibration and/or oscillation due to the nature of submerged combustion. One method includes predicting a value of at least one property, such as viscosity, of the molten glass using the variable system vibration and/or oscillation.

9 Claims, 7 Drawing Sheets

(56) References Cited

U.S. PATENT DOCUMENTS

| | | | |
|---|---|---|---|
| 2,781,756 A | 2/1957 | Kobe | |
| 2,867,972 A * | 1/1959 | Holderreed et al. | 159/16.2 |
| 2,878,644 A | 3/1959 | Fenn | |
| 2,890,166 A | 6/1959 | Heinze | |
| 2,902,029 A | 9/1959 | Hill | |
| 2,981,250 A | 4/1961 | Stewart | |
| 3,020,165 A | 2/1962 | Davis | |
| 3,056,283 A | 10/1962 | Tiede | |
| 3,073,683 A | 1/1963 | Switzer et al. | |
| 3,084,392 A | 4/1963 | Labino | |
| 3,088,812 A | 5/1963 | Bitterlich et al. | |
| 3,104,947 A | 9/1963 | Switzer et al. | |
| 3,129,087 A * | 4/1964 | Hagy | 65/162 |
| 3,160,578 A | 12/1964 | Saxton et al. | |
| 3,165,452 A | 1/1965 | Williams | |
| 3,170,781 A | 2/1965 | Keefer | |
| 3,174,820 A | 3/1965 | See et al. | |
| 3,215,189 A | 11/1965 | Bauer | |
| 3,224,855 A | 12/1965 | Plumat | |
| 3,237,929 A | 3/1966 | Plumat et al. | |
| 3,239,325 A * | 3/1966 | Roberson et al. | 65/162 |
| 3,241,548 A | 3/1966 | See et al. | |
| 3,248,205 A | 4/1966 | Dolf et al. | |
| 3,260,587 A | 7/1966 | Dolf et al. | |
| 3,268,313 A | 8/1966 | Burgman et al. | |
| 3,285,834 A | 11/1966 | Guerrieri et al. | |
| 3,325,298 A | 6/1967 | Brown | |
| 3,380,463 A * | 4/1968 | Trethewey | 137/4 |
| 3,402,025 A | 9/1968 | Garrett et al. | |
| 3,407,805 A | 10/1968 | Bougard | |
| 3,407,862 A | 10/1968 | Mustian, Jr. | |
| 3,421,873 A | 1/1969 | Burgman et al. | |
| 3,432,399 A | 3/1969 | Schutt | |
| 3,445,214 A | 5/1969 | Oremesher | |
| 3,498,779 A | 3/1970 | Hathaway | |
| 3,510,393 A | 5/1970 | Burgman et al. | |
| 3,525,674 A | 8/1970 | Barnebey | |
| 3,533,770 A | 10/1970 | Adler et al. | |
| 3,592,623 A | 7/1971 | Shepherd | |
| 3,606,825 A | 9/1971 | Johnson | |
| 3,617,234 A | 11/1971 | Hawkins et al. | |
| 3,627,504 A | 12/1971 | Johnson et al. | |
| 3,692,017 A | 9/1972 | Glachant et al. | |
| 3,717,139 A | 2/1973 | Guillet et al. | |
| 3,738,792 A | 6/1973 | Feng | |
| 3,746,527 A | 7/1973 | Knavish et al. | |
| 3,747,599 A | 7/1973 | Malmin | |
| 3,754,879 A | 8/1973 | Phaneuf | |
| 3,756,800 A | 9/1973 | Phaneuf | |
| 3,763,915 A | 10/1973 | Perry et al. | |
| 3,764,287 A | 10/1973 | Brocious | |
| 3,771,988 A | 11/1973 | Starr | |
| 3,818,893 A | 6/1974 | Kataoka et al. | |
| 3,835,909 A | 9/1974 | Douglas et al. | |
| 3,840,002 A | 10/1974 | Douglas et al. | |
| 3,885,945 A | 5/1975 | Rees et al. | |
| 3,907,585 A | 9/1975 | Francel et al. | |
| 3,913,560 A | 10/1975 | Lazarre et al. | |
| 3,951,635 A | 4/1976 | Rough | |
| 3,976,464 A | 8/1976 | Wardlaw | |
| 4,001,001 A | 1/1977 | Knavish et al. | |
| 4,004,903 A | 1/1977 | Daman et al. | |
| 4,083,711 A | 4/1978 | Jensen | |
| 4,110,098 A | 8/1978 | Mattmuller | |
| 4,153,438 A | 5/1979 | Stream | |
| 4,185,982 A | 1/1980 | Schwenninger | |
| 4,203,761 A | 5/1980 | Rose | |
| 4,226,564 A | 10/1980 | Takahashi et al. | |
| 4,238,226 A | 12/1980 | Sanzenbacher et al. | |
| 4,249,927 A | 2/1981 | Fukuzaki et al. | |
| 4,270,740 A | 6/1981 | Sanzenbacher et al. | |
| 4,282,023 A | 8/1981 | Hammel et al. | |
| 4,303,435 A | 12/1981 | Sleighter | |
| 4,316,734 A * | 2/1982 | Spinosa et al. | 65/134.9 |
| 4,323,718 A | 4/1982 | Buhring et al. | |
| 4,349,376 A | 9/1982 | Dunn et al. | |
| 4,406,683 A | 9/1983 | Demarest | |
| 4,413,882 A | 11/1983 | Bailey et al. | |
| 4,488,537 A | 12/1984 | Laurent | |
| 4,539,034 A | 9/1985 | Hanneken | |
| 4,542,106 A | 9/1985 | Sproull | |
| 4,545,800 A | 10/1985 | Won et al. | |
| 4,626,199 A | 12/1986 | Bounini | |
| 4,632,687 A | 12/1986 | Kunkle et al. | |
| 4,634,461 A | 1/1987 | Demarest, Jr. et al. | |
| 4,657,586 A | 4/1987 | Masterson et al. | |
| 4,735,642 A | 4/1988 | Jensen et al. | |
| 4,738,938 A | 4/1988 | Kunkle et al. | |
| 4,758,259 A | 7/1988 | Jensen | |
| 4,814,387 A | 3/1989 | Donat | |
| 4,816,056 A | 3/1989 | Tsai et al. | |
| 4,877,436 A | 10/1989 | Sheinkop | |
| 4,882,736 A | 11/1989 | Pieper | |
| 4,919,700 A | 4/1990 | Pecoraro et al. | |
| 4,927,886 A | 5/1990 | Backderf et al. | |
| 4,953,376 A | 9/1990 | Merlone | |
| 5,032,230 A | 7/1991 | Shepherd | |
| 5,052,874 A | 10/1991 | Johanson | |
| 5,062,789 A | 11/1991 | Gitman | |
| 5,097,802 A | 3/1992 | Clawson | |
| 5,168,109 A | 12/1992 | Backderf et al. | |
| 5,169,424 A | 12/1992 | Grinnen et al. | |
| 5,199,866 A | 4/1993 | Joshi et al. | |
| 5,204,082 A | 4/1993 | Schendel | |
| 5,299,929 A | 4/1994 | Yap | |
| 5,360,171 A | 11/1994 | Yap | |
| 5,374,595 A | 12/1994 | Dumbaugh et al. | |
| 5,405,082 A | 4/1995 | Brown et al. | |
| 5,449,286 A | 9/1995 | Snyder et al. | |
| 5,483,548 A | 1/1996 | Coble | |
| 5,490,775 A | 2/1996 | Joshi et al. | |
| 5,545,031 A | 8/1996 | Joshi et al. | |
| 5,575,637 A | 11/1996 | Slavejkov et al. | |
| 5,595,703 A | 1/1997 | Swaelens et al. | |
| 5,606,965 A | 3/1997 | Panz et al. | |
| 5,613,994 A | 3/1997 | Muniz et al. | |
| 5,615,668 A | 4/1997 | Panz et al. | |
| 5,636,623 A | 6/1997 | Panz et al. | |
| 5,672,827 A | 9/1997 | Jursich | |
| 5,713,668 A | 2/1998 | Lunghofer et al. | |
| 5,718,741 A | 2/1998 | Hull et al. | |
| 5,736,476 A | 4/1998 | Warzke et al. | |
| 5,743,723 A | 4/1998 | Iatrides et al. | |
| 5,765,964 A | 6/1998 | Calcote et al. | |
| 5,814,121 A | 9/1998 | Travis | |
| 5,829,962 A | 11/1998 | Drasek et al. | |
| 5,833,447 A | 11/1998 | Bodelin et al. | |
| 5,849,058 A | 12/1998 | Takeshita et al. | |
| 5,863,195 A | 1/1999 | Feldermann | |
| 5,944,864 A | 8/1999 | Hull et al. | |
| 5,954,498 A | 9/1999 | Joshi et al. | |
| 5,975,886 A | 11/1999 | Philippe | |
| 5,979,191 A | 11/1999 | Jian | |
| 5,984,667 A | 11/1999 | Philippe et al. | |
| 5,993,203 A | 11/1999 | Koppang | |
| 6,029,910 A | 2/2000 | Joshi et al. | |
| 6,039,787 A | 3/2000 | Edlinger | |
| 6,045,353 A | 4/2000 | VonDrasek et al. | |
| 6,068,468 A | 5/2000 | Phillipe et al. | |
| 6,071,116 A | 6/2000 | Philippe et al. | |
| 6,074,197 A | 6/2000 | Philippe | |
| 6,077,072 A | 6/2000 | Marin et al. | |
| 6,085,551 A | 7/2000 | Pieper et al. | |
| 6,109,062 A | 8/2000 | Richards | |
| 6,113,389 A | 9/2000 | Joshi et al. | |
| 6,116,896 A | 9/2000 | Joshi et al. | |
| 6,120,889 A | 9/2000 | Turner et al. | |
| 6,123,542 A | 9/2000 | Joshi et al. | |
| 6,126,438 A | 10/2000 | Joshi et al. | |
| 6,154,481 A | 11/2000 | Sorg et al. | |
| 6,156,285 A | 12/2000 | Adams et al. | |
| 6,171,100 B1 | 1/2001 | Joshi et al. | |
| 6,183,848 B1 | 2/2001 | Turner et al. | |
| 6,210,151 B1 | 4/2001 | Joshi et al. | |

(56) References Cited

U.S. PATENT DOCUMENTS

| | | |
|---|---|---|
| 6,210,703 B1 | 4/2001 | Novich |
| 6,237,369 B1 | 5/2001 | LeBlanc et al. |
| 6,241,514 B1 | 6/2001 | Joshi et al. |
| 6,244,197 B1 | 6/2001 | Coble |
| 6,244,857 B1 | 6/2001 | VonDrasek et al. |
| 6,247,315 B1 | 6/2001 | Marin et al. |
| 6,250,136 B1 | 6/2001 | Igreja |
| 6,250,916 B1 | 6/2001 | Philippe et al. |
| 6,274,164 B1 | 8/2001 | Novich |
| 6,276,924 B1 | 8/2001 | Joshi et al. |
| 6,276,928 B1 | 8/2001 | Joshi et al. |
| 6,293,277 B1 * | 9/2001 | Panz et al. ........... 126/360.2 |
| 6,314,760 B1 | 11/2001 | Chenoweth |
| 6,314,896 B1 | 11/2001 | Marin et al. |
| 6,338,337 B1 | 1/2002 | Panz et al. |
| 6,344,747 B1 | 2/2002 | Lunghofer et al. |
| 6,357,264 B1 * | 3/2002 | Richards ............. 65/135.2 |
| 6,386,271 B1 | 5/2002 | Kawamoto et al. |
| 6,418,755 B2 | 7/2002 | Chenoweth |
| 6,422,041 B1 | 7/2002 | Simpson et al. |
| 6,454,562 B1 | 9/2002 | Joshi et al. |
| 6,460,376 B1 | 10/2002 | Jeanvoine et al. |
| 6,536,651 B2 | 3/2003 | Ezumi et al. |
| 6,558,606 B1 | 5/2003 | Kulkarni et al. |
| 6,660,106 B1 | 12/2003 | Babel et al. |
| 6,694,791 B1 | 2/2004 | Johnson et al. |
| 6,701,617 B2 | 3/2004 | Li et al. |
| 6,705,118 B2 | 3/2004 | Simpson et al. |
| 6,708,527 B1 | 3/2004 | Ibarlucea et al. |
| 6,711,942 B2 | 3/2004 | Getman et al. |
| 6,715,319 B2 | 4/2004 | Barrow et al. |
| 6,722,161 B2 * | 4/2004 | LeBlanc ............. 65/134.4 |
| 6,736,129 B1 * | 5/2004 | Smith ............. 126/343.5 R |
| 6,739,152 B2 | 5/2004 | Jeanvoine et al. |
| 6,796,147 B2 | 9/2004 | Borysowicz et al. |
| 6,797,351 B2 | 9/2004 | Kulkarni et al. |
| 6,854,290 B2 | 2/2005 | Hayes et al. |
| 6,857,999 B2 | 2/2005 | Jeanvoine |
| 6,883,349 B1 | 4/2005 | Jeanvoine |
| 6,918,256 B2 | 7/2005 | Gutmark et al. |
| 7,027,467 B2 | 4/2006 | Baev et al. |
| 7,116,888 B1 | 10/2006 | Aitken et al. |
| 7,134,300 B2 | 11/2006 | Hayes et al. |
| 7,168,395 B2 | 1/2007 | Engdahl |
| 7,231,788 B2 | 6/2007 | Karetta et al. |
| 7,273,583 B2 | 9/2007 | Rue et al. |
| 7,330,634 B2 | 2/2008 | Aitken et al. |
| 7,383,698 B2 | 6/2008 | Ichinose et al. |
| 7,392,668 B2 | 7/2008 | Adams et al. |
| 7,428,827 B2 | 9/2008 | Maugendre et al. |
| 7,441,686 B2 | 10/2008 | Odajima et al. |
| 7,448,231 B2 | 11/2008 | Jeanvoine et al. |
| 7,454,925 B2 | 11/2008 | DeAngelis et al. |
| 7,509,819 B2 | 3/2009 | Baker et al. |
| 7,565,819 B2 | 7/2009 | Jeanvoine et al. |
| 7,578,988 B2 | 8/2009 | Jacques et al. |
| 7,581,948 B2 | 9/2009 | Borders et al. |
| 7,622,677 B2 | 11/2009 | Barberree et al. |
| 7,624,595 B2 | 12/2009 | Jeanvoine et al. |
| 7,748,592 B2 | 7/2010 | Koga et al. |
| 7,767,606 B2 | 8/2010 | McGinnis et al. |
| 7,778,290 B2 | 8/2010 | Sacks et al. |
| 7,781,562 B2 | 8/2010 | Crawford et al. |
| 7,802,452 B2 * | 9/2010 | Borders et al. ........... 65/468 |
| 7,832,365 B2 | 11/2010 | Hannum et al. |
| 7,845,314 B2 | 12/2010 | Smith |
| 7,855,267 B2 | 12/2010 | Crawford et al. |
| 2002/0086077 A1 | 7/2002 | Noller et al. |
| 2002/0152770 A1 | 10/2002 | Becher et al. |
| 2002/0162358 A1 | 11/2002 | Jeanvoine et al. |
| 2002/0166343 A1 * | 11/2002 | LeBlanc ............. 65/134.4 |
| 2004/0168474 A1 | 9/2004 | Jeanvoine et al. |
| 2004/0224833 A1 | 11/2004 | Jeanvoine et al. |
| 2005/0039491 A1 | 2/2005 | Maugendre et al. |
| 2005/0103323 A1 | 5/2005 | Engdahl |
| 2006/0000239 A1 | 1/2006 | Jeanvoine et al. |
| 2006/0101859 A1 * | 5/2006 | Takagi et al. ........... 65/32.5 |
| 2006/0174655 A1 | 8/2006 | Kobayashi et al. |
| 2006/0233512 A1 | 10/2006 | Aitken et al. |
| 2006/0257097 A1 | 11/2006 | Aitken et al. |
| 2006/0287482 A1 | 12/2006 | Crawford et al. |
| 2006/0293494 A1 | 12/2006 | Crawford et al. |
| 2006/0293495 A1 | 12/2006 | Crawford et al. |
| 2007/0106054 A1 | 5/2007 | Crawford et al. |
| 2007/0122332 A1 | 5/2007 | Jacques et al. |
| 2007/0130994 A1 | 6/2007 | Boratav et al. |
| 2007/0137259 A1 * | 6/2007 | Borders et al. ........... 65/454 |
| 2007/0212546 A1 | 9/2007 | Jeanvoine et al. |
| 2007/0220922 A1 | 9/2007 | Bauer et al. |
| 2008/0035078 A1 | 2/2008 | Li |
| 2008/0227615 A1 | 9/2008 | McGinnis et al. |
| 2008/0256981 A1 | 10/2008 | Jacques et al. |
| 2008/0276652 A1 * | 11/2008 | Bauer et al. ........... 65/454 |
| 2008/0293857 A1 | 11/2008 | Crawford et al. |
| 2009/0042709 A1 | 2/2009 | Jeanvoine et al. |
| 2009/0044568 A1 * | 2/2009 | Lewis ............. 65/134.4 |
| 2009/0176639 A1 * | 7/2009 | Jacques et al. ........... 501/17 |
| 2009/0220899 A1 | 9/2009 | Spangelo et al. |
| 2010/0064732 A1 * | 3/2010 | Jeanvoine et al. ........... 65/482 |
| 2010/0087574 A1 | 4/2010 | Crawford et al. |
| 2010/0089383 A1 | 4/2010 | Cowles |
| 2010/0120979 A1 | 5/2010 | Crawford et al. |
| 2010/0143601 A1 | 6/2010 | Hawtof et al. |
| 2010/0162757 A1 * | 7/2010 | Brodie ............. 65/19 |
| 2010/0227971 A1 | 9/2010 | Crawford et al. |
| 2010/0236323 A1 | 9/2010 | D'Angelico et al. |
| 2010/0242543 A1 * | 9/2010 | Ritter et al. ........... 65/178 |
| 2010/0300153 A1 | 12/2010 | Zhang et al. |
| 2010/0304314 A1 | 12/2010 | Rouchy et al. |
| 2010/0307196 A1 | 12/2010 | Richardson |
| 2010/0319404 A1 * | 12/2010 | Borders et al. ........... 65/384 |
| 2010/0326137 A1 | 12/2010 | Rouchy et al. |
| 2011/0054091 A1 | 3/2011 | Crawford et al. |
| 2011/0061642 A1 | 3/2011 | Rouchy et al. |
| 2011/0088432 A1 | 4/2011 | Purnode et al. |
| 2011/0107670 A1 | 5/2011 | Galley et al. |
| 2011/0236846 A1 | 9/2011 | Rue et al. |
| 2012/0216567 A1 * | 8/2012 | Boughton et al. ........... 65/29.18 |
| 2012/0216576 A1 * | 8/2012 | Boughton et al. ........... 65/160 |

FOREIGN PATENT DOCUMENTS

| | | |
|---|---|---|
| DE | 10 2005 033330 B3 | 8/2006 |
| EP | 0 181 248 B1 | 10/1989 |
| EP | 1 337 789 B1 | 12/2004 |
| EP | 1 990 321 A1 | 11/2008 |
| EP | 2 133 315 A1 | 12/2009 |
| EP | 1 986 966 B1 | 4/2010 |
| EP | 1 667 934 B1 | 2/2011 |
| FR | 2 740 860 A1 | 9/1997 |
| GB | 191301772 | 1/1914 |
| GB | 191407633 | 3/1914 |
| GB | 164073 | 5/1921 |
| IT | 1208172 | 7/1989 |
| RO | 114827 | 7/1999 |
| WO | 9855411 A1 | 12/1998 |
| WO | 2008103291 A1 | 8/2008 |
| WO | 2009091558 A1 | 7/2009 |
| WO | 2010011701 A2 | 1/2010 |
| WO | 2010045196 A3 | 4/2010 |

OTHER PUBLICATIONS

Furman, BJ, ME 120 Experimental Methods Vibration Measurement, San Jose University Department of Mechanical and Aerospace Engineering.

"Glass Technologies—The Legacy of a Successful Public-Private Partnership", 2007, U.S. Department of Energy, pp. 1-32.

"Gass Melting Technology—A Technical and Economic Assessment," 2004, U.S. Department of Energy, pp. 1-292.

Rue, "Energy-Efficient Glass Melting—The Next Generation Melter", Gas Technology Institute, Project No. 20621 Final Report (2008).

(56) References Cited

OTHER PUBLICATIONS

"Glass Industry of the Future", United States Department of Energy, report 02-GA50113-03, pp. 1-17, Sep. 30, 2008.

Olavin, V.M. et al, "Submerged Combustion Furnace for Glass Melts," Ceramic Engineering and Science Proceedings, Jan. 1, 1996, pp. 84-92, vol. 17—No. 2, American Ceramic Society Inc., US.

* cited by examiner

METHODS OF USING A SUBMERGED COMBUSTION MELTER TO PRODUCE GLASS PRODUCTS

CROSS-REFERENCE TO RELATED APPLICATIONS

This application is related to assignee's U.S. non-provisional patent application Ser. No. 12/817,754, filed Jun. 17, 2010; Ser. No. 12/888,970, filed Sep. 23, 2010; Ser. No. 13/267,990, filed Oct. 7, 2011; and Ser. No. 13/268,028, filed Oct. 7, 2011, all of which are incorporated herein by reference.

BACKGROUND INFORMATION

1. Technical Field

The present disclosure relates generally to the field of submerged combustion glass melters and methods of use.

2. Background Art

Submerged combustion melters are known for producing molten glass. The nature of submerged combustion melters and their operation cause a perceptible and measurable vibration and/or oscillation in the system.

It would be an advance in the submerged combustion glass melting art to develop methods of using the vibration and/or oscillation of the submerged combustion melter, either alone or in combination with other system parameters, to predict properties of the molten glass or other material melted within the melter, particularly in situations where melter feeds, fuels, and/or oxidants are changing or expected to change.

SUMMARY

In accordance with the present disclosure, methods of using vibrations and/or oscillations of a submerged combustion melter are described that may allow predicting or tuning of one or more molten or finished glass parameters.

A first aspect of the disclosure is a method, the method comprising:

a) flowing an oxidant and a fuel into a submerged combustion burner in a glass tank furnace, the glass tank furnace also receiving a feed of glass forming material, the burner and furnace comprising a melting system, the melting system having a variable system vibration, the melting system producing molten glass; and b) predicting a value of at least one property of the molten glass using at least the variable system vibration.

A second aspect of the disclosure is method of producing molten glass using submerged combustion, the method comprising:

a) flowing an oxidant and a fuel into at least one submerged combustion burner in a glass tank furnace, the glass tank furnace also receiving a feed of glass forming material, the burner and furnace comprising a melting system, the melting system having a variable system vibration, the melting system producing molten glass;

b) measuring frequency and/or amplitude of the variable system vibration; and b) predicting a value of viscosity of the molten glass using at least the measured frequency and/or amplitude of the variable system vibration.

A third aspect of the disclosure is a method of producing molten glass using submerged combustion, the method comprising:

a) flowing an oxidant and a fuel into at least one submerged combustion burner in a glass tank furnace, the glass tank furnace also receiving a feed of glass forming material, the burner and furnace comprising a melting system, the melting system having a variable system vibration, the melting system producing molten glass;

b) measuring frequency and/or amplitude of the variable system vibration;

c) analyzing the frequency and/or amplitude of the variable system vibration using one or more mathematical techniques to identify one or more key frequencies and/or amplitudes; and b) predicting a value of viscosity of the molten glass using at least the measured frequency and/or amplitude of the variable system vibration.

Certain methods within the disclosure include feeding forward the predicted value of the at least one property to a controller controlling a process or component downstream of the glass tank melter into which at least a portion of the molten glass flows.

Methods of the disclosure will become more apparent upon review of the brief description of the drawings, the detailed description of the disclosure, and the claims that follow.

BRIEF DESCRIPTION OF THE DRAWINGS

The manner in which the objectives of the disclosure and other desirable characteristics can be obtained is explained in the following description and attached drawings in which.

It is to be noted, however, that FIGS. 1-4 of the appended drawings are not to scale and illustrate only typical embodiments of this disclosure, and are therefore not to be considered limiting of its scope, for the disclosure may admit to other equally effective embodiments.

DETAILED DESCRIPTION

In the following description, numerous details are set forth to provide an understanding of the disclosed methods and systems for carrying out the methods. However, it will be understood by those skilled in the art that the methods and systems may be practiced without these details and that numerous variations or modifications from the specifically described embodiments may be possible and are deemed within the claims or claimable subject matter in this or subsequent patents. All United States (U.S.) published patent applications and U.S. Patents referenced herein are hereby explicitly incorporated herein by reference. In the event definitions of terms in the referenced patents and applications conflict with how those terms are defined in the present application, the definitions for those terms that are provided in the present application shall be deemed controlling.

The term "fuel", according to this disclosure, means a combustible composition comprising a major portion of, for example, methane, natural gas, liquefied natural gas, propane, atomized oil or the like (either in gaseous or liquid form).

Fuels useful in the disclosure may comprise minor amounts of non-fuels therein, including oxidants, for purposes such as premixing the fuel with the oxidant, or atomizing liquid fuels. As used herein the term "fuel" includes gaseous fuels, liquid fuels, flowable solids, such as powdered carbon or particulate material, waste materials, slurries, and mixtures or other combinations thereof. When the fuel comprises gaseous fuel, the gaseous fuel may be selected from the group consisting of methane, natural gas, liquefied natural gas, propane, carbon monoxide, hydrogen, steam-reformed natural gas, atomized oil or mixtures thereof.

"Oxidant" means air, or compositions comprising the same molar concentration of oxygen as air, while the term "oxygen" means a gas with an oxygen molar concentration of at least 50%. Such oxidants include oxygen-enriched air containing at least 50% vol., oxygen such as "industrially" pure oxygen (99.5%) produced by a cryogenic air separation plant or non-pure oxygen produced by an adsorption process or membrane permeation process (about 90% vol. oxygen or more).

Submerged combustion melters useful in methods and systems of the present disclosure may be comprised of metal, ceramic, ceramic-lined metal, or combination thereof. Suitable metals include stainless steels, for example, but not limited to, 306 and 316 steel, as well as titanium alloys, aluminum alloys, and the like.

In all embodiments of the disclosure the sources of oxidant and fuel may be one or more conduits, pipelines, storage facility, cylinders, or, in embodiments where the oxidant is air, ambient air. Oxygen-enriched oxidants may be supplied from a pipeline, cylinder, storage facility, cryogenic air separation unit, membrane permeation separator, or adsorption unit such as a vacuum swing adsorption unit. Certain burner and melter embodiments may comprise a source of oxidant fluidly connected to the second conduit for routing the oxidant to the primary annulus, wherein the oxidant is selected from the group consisting of air and oxygen-enriched air, and a source of fuel fluidly connected to the second end of the first conduit for routing the fuel to the longitudinal bore of the first conduit.

In certain methods of the disclosure the predicted and/or controlled property of the molten glass may be a physical property selected from the group consisting of boiling point, color, concentration, density, electrical conductivity or impedance, flexibility, flow rate, mass, melting point, pressure, specific heat, resistivity, temperature, tension, velocity, viscosity, and volume.

In certain methods the predicting step may comprise measuring the depth or level of molten glass in the glass tank furnace, and using the measured depth or level in the predicting.

Certain method embodiments may comprise feeding forward the predicted value of the at least one property to a controller controlling a process or component downstream of the glass tank melter into which at least a portion of the molten glass flows.

Certain method embodiments may comprise using the predicted value of the at least one property of the melt to control the glass tank furnace.

Certain method embodiments may comprise feeding forward the predicted value of the at least one property of the melt to a controller controlling a process or component downstream of the glass tank melter into which at least a portion of the molten glass flows and using the predicted value of the at least one property to control the glass tank furnace.

Certain method embodiments may comprise measuring frequency and/or amplitude of the variable system vibration.

Certain methods may comprise analyzing the frequency and/or amplitude of the variable system vibration using one or more mathematical techniques to identify one or more key frequencies and/or amplitudes. Certain methods may comprise measuring at least one other system property selected from the group consisting of flow rate of oxidant, flow rate of fuel, flow rate of glass forming material, flow rate of molten glass, glass tank furnace pressure, height or depth of molten glass in the glass tank furnace, and combinations thereof. In certain methods the predicting may comprise using a technique selected from the group consisting of linear regression, non-linear modeling, and neural net modeling.

Certain method and systems embodiments of the disclosure may be controlled by one or more controllers. For example, burner flame temperature may be controlled by monitoring one or more parameters selected from velocity of the fuel, velocity of the primary oxidant, mass flow rate of the fuel, mass flow rate of the primary oxidant, energy content of the fuel, temperature of the fuel as it enters the burner, temperature of the primary oxidant as it enters the burner, temperature of the effluent, pressure of the primary oxidant entering the burner, humidity of the oxidant, burner geometry, combustion ratio, and combinations thereof. Exemplary methods and systems of the disclosure may comprise one or more slave combustion controller which receives one or more input parameters selected from velocity of the fuel, velocity of the primary oxidant, mass flow rate of the fuel, mass flow rate of the primary oxidant, energy content of the fuel, temperature of the fuel as it enters the burner, temperature of the primary oxidant as it enters the burner, pressure of the oxidant entering the burner, humidity of the oxidant, burner geometry, oxidation ratio, temperature of the effluent and combinations thereof, and may employ a control algorithm to control combustion temperature based on one or more of these input parameters. One or more of the slave combustion controllers may feed one or more outputs to one or more master controllers that receive measurements indicative of one or more melter vibrations and/or oscillations, the master controller then predicting a parameter of the melt for feeding forward to another process, or controlling the melter, or both.

Figure 1:
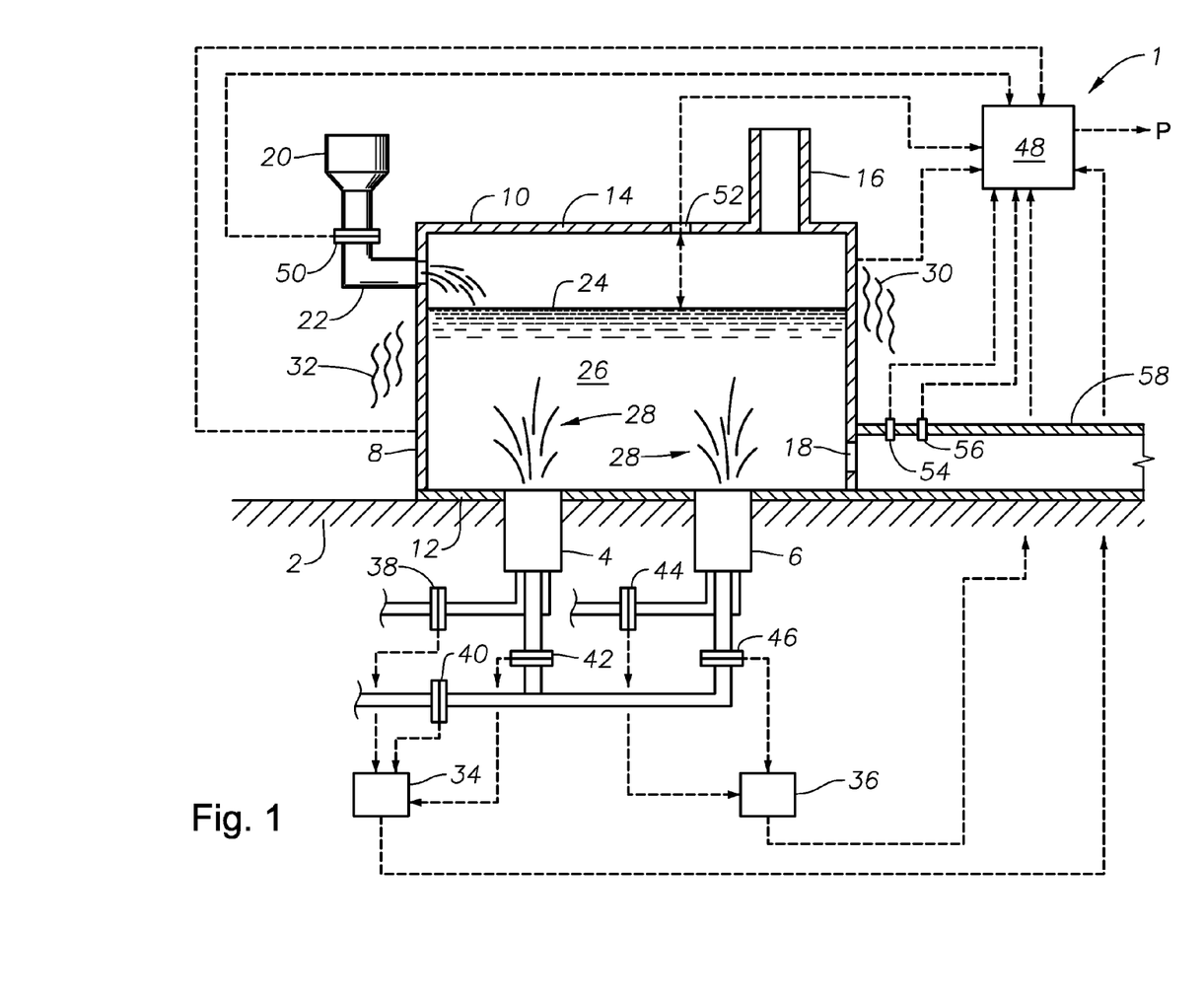
FIG. 1 is a schematic side-elevation view, partially in cross-section of a submerged combustion melter and method of controlling same and/or predicting a parameter of the melt in accordance with the present disclosure.

Referring now to the figures, FrG, 1 is a side-elevation view, partially in cross-section, of as submerged combustion melter system and method embodiment 1 in accordance with the present disclosure, including a glass tank furnace or inciter 10 positioned on a plant floor or other surface 2, including two burners 4 and 6, one or both of which may be of the adjustable burner type described in assignee's co-pending U.S. patent application Ser. No. 13/268,028, filed Oct. 7, 2011, comprising first and second conduits configured to form a primary annulus between the external surface of the first conduit and the internal surface of the second conduit, and an adjustable structure comprising a generally cylindrical central hub adjustable axially in relation to and removably attached to the first end of the first conduit, the hub defining a central passage and one or more non-central through passages. More than or less than two burners may be used, as well as burners of other designs, as long as one submerged burner is present. Melter 10 includes sidewalls 8, a floor 12, a roof 14, an exhaust chute 16, and a glass melt exit 18. A glass-forming material feed bin 20 may be attached to melter sidewall 8 via a conduit 22. One or more burners 4, 6 may be in one or more sidewalls 8, as long as the flame and/or products of combustion 28 emanate below surface 24 of melt 26. Burners 4, 6 may be positioned in a sidewall 8 or floor 12 of submerged combustion melter 10 such that the longitudinal axis of the burners makes an angle to a side panel 8 or floor 12 of molter 10 ranging from about 30 to about 90 degrees, Sidewalls 8, floor 12, and roof 14 are typically composed of ceramic or other refractory material. Other melter designs, having other feed arrangements, burner arrangements, and wall designs, such as disclosed in assignee's co— pending application Ser. No. 12/817,754, filed Jun. 17, 2010; Ser. No. 12/888,970; filed Sep. 23, 2010; and 13/267,990, 13/268,028, 13/268,098, and 13/268,130 all filed Oct. 7, 2011, and U.S. Pat. No. 7,273,583, are considered within the present disclosure.

Still referring to FIG. 1, the inventors herein have discovered that submerged combustion melter systems such as illustrated schematically in embodiment 1 of FIG. 1 may exhibit vibration and/or oscillation depending on their configuration, as indicated in FIG. 1 at 30 and 32. The inventors herein have also discovered that this vibration and/or oscillation may be used for one or more useful purposes, such as controlling (or contributing to the control of) submerged combustion melter 10, and/or controlling or contributing to the control of one or more processes or systems downstream of melter 10. As a non-limiting example, embodiment 1 illustrated schematically in FIG. 1 employs burner controllers 34, 36, which may be programmable logic controllers or other controllers. In this embodiment, controller 34 receives signals (signals, which may be wired or wireless, are indicated by dashed lines) from oxidant flow meter 38 and fuel flow meters 40, 42, while controller 36 receives signals from oxidant flow meter 44 and fuel flow meter 46. Controllers 34 and 36 may send control signals to control valves (not illustrated) controlling flow of fuel (such as natural gas) and oxidant (such as oxygen) to burners 4 and 6. A main or primary, or master controller 48 may receive one or signals indicating vibration and/or oscillation of one or more locations of melter 10. Master controller 48 may also receive various other signals, for example from burner controllers 34, 36; a glass forming material feed flow meter 50; from a molten glass depth or level sensor 52; from a melt temperature sensor 54; and/or from a melt flow rate sensor 56 in a forehearth 58. A predicted value P of the melt may then be computed or estimated mathematically by controller 48 and used for one or more purposes, as noted further herein. It will be understood that many control variations are possible. For example, controller 48 may receive signals directly from flow meters 38, 40, 42, 44, and 46 rather than through burner controllers 34, 36. In the figures, direction of flow of signal is indicated by arrows. Indication of an arrow in one direction does not necessarily mean signals cannot be sent the opposite direction. Double headed arrows, while generally indicating that signals may be sent and received between two components, does not mean that signals are always sent between those components in both directions.

Figure 2:
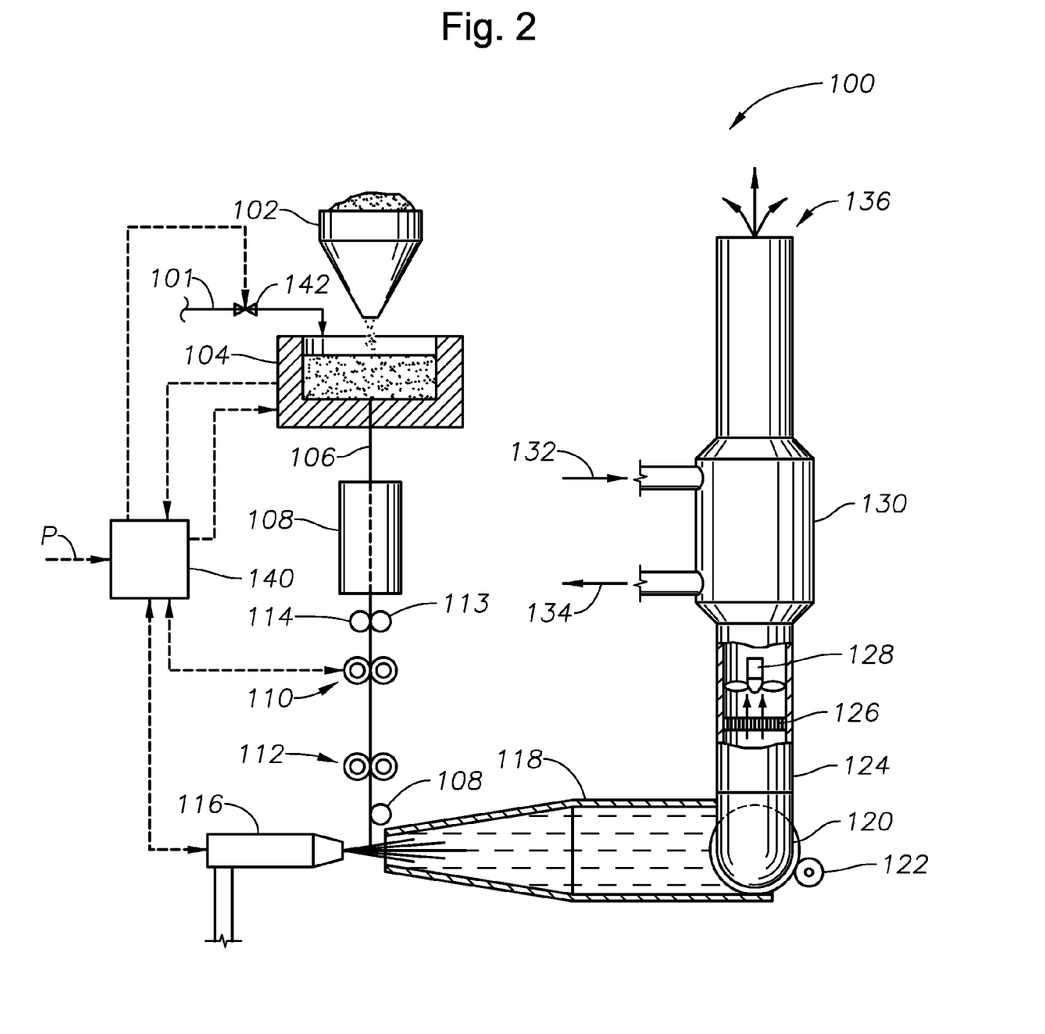
FIGS. 2, 3 and 4 are schematic side elevation views, partially in cross-section, of downstream systems and methods that may be controlled using a predicted value of a parameter from the system and method of FIG. 1.

Referring now to FIG. 2, FIG. 2 is a schematic process flow diagram of a prior art air-fuel fiberization system and method embodiment 100 that may benefit from the systems and methods of the invention. Molten glass 101 from forehearth 58 of embodiment 1 may be transported to a heated pot 104. Optionally, glass marbles may be transported to distribution hopper 102 and then into heated pot 104, which then melts the marbles into molten glass. Molten glass 101 and/or marbles may be transported to feed hopper 102 and/or heated pot 104 with a distribution manifold to a plurality of heated pots 104, the feed rate to heated pots 104 being a function of pot temperature and roller 110 rpm. Heated pot 104, sometimes referred to as the marble pot, may typically comprise a metallic cylinder heated with a heating jacket using premixed natural gas burners on its side walls. The bottom of marble pot 104 may be formed from a metal alloy comprising multiple holes ranging from about 0.05 inch to 0.5 inch in diameter, depending on the glass fiber product being made, through which the molten glass is drawn into primary fibers 106 (only one primary fiber is shown). Primary fibers 106 may be pulled and directed by rollers 112 and by fiber guides 113 and 114 through a heat containment shield 108. Shield 108 may extend in space between the bottom of marble pot 104 to the top of the first set of rollers 110, and functions to control the cooling rate of the primary fiber. The objective is to keep the primary fiber as hot as possible without damaging roller pad material in the rollers. In addition to the heat shield, heat sources, such as infrared sources may be placed in the spaces before rollers 110 and 112 or after the rollers.

A fiberization burner 116, which may be an air-fuel or oxy-fuel burner, functions to produce a hot flame at a controlled temperature, velocity, and oxidation state. The glass fiber product to be manufactured is a function of the mass flow rate of the glass, the primary glass fiber diameter, the flame temperature produced by burner 116, the slot size and pressure inside of burner 116, and the product code fiber diameter. Benefits of using oxygen or oxygen-enriched air as an oxidant in fiberization burners may include higher flame temperature fiberization, which may lead to increased fiber tensile strength, longer fibers, and reduce production or elimination of shot, or looser process control to avoid producing shot. Fluctuations in humidity may be reduced, and variation in fiber quality may be reduced.

In accordance with the present disclosure, a controller 140 may receive a signal P from controller 48 controlling melter system and method 1 (FIG. 1). Controller 140 may also receive signals from heated pot 104, pull rollers 110, and/or burner 116, and may send one or more control signals to a valve 142, heated pot 104, pull rollers 110, and/or burner 116.

In the system and method illustrated schematically in FIG. 2, a collection chamber 118 comprising a generally cylindrical chute collects short fibers and entrains air into chamber 118 to rapidly cool the molten fibers. The fiber are then routed to a larger section of chamber 118 where at the far end a fiber pickup drum 120 collects the fibers, where a secondary fiber pickup apparatus 122, such as vacuum ducting or a roller, removes the fibers. Pickup drum 120 is typically a rotating perforated steel cylinder with a filter material suitable for collecting fibers secured to the outer surface of the cylinder, with aide of negative pressure on the inside of drum 120. Combustion gases, any particulates, and excess air (in the prior art process, and in addition excess oxygen in systems and methods of the present disclosure) pass through drum 120 through ducting 124 and flow through a particulate removal device 126, with aide of an exhaust fan 128. A heat exchanger 130 may be used to cool exhaust gases, which exit to atmosphere at 136. In prior art system and methods using air-fuel combustion, cool air 132 is used to cool the exhaust, resulting in warmed air 134 of low grade heat content, largely unusable in heat recovery. However, with the higher temperatures experienced in oxy-fuel combustion if used in fiberization burner 116, this heat may be recovered and used in various ways. In light of the higher fiberization burner flame temperatures involved when using oxy-fuel fiberization burners (from about 2200 to about 3200° F. as opposed to 1900° F. for air-fuel fiberization flame temperatures), opportunities exist also for heat recovery and energy savings, as further explained in assignee's U.S. Pat. No. 7,802,452

Figure 3:
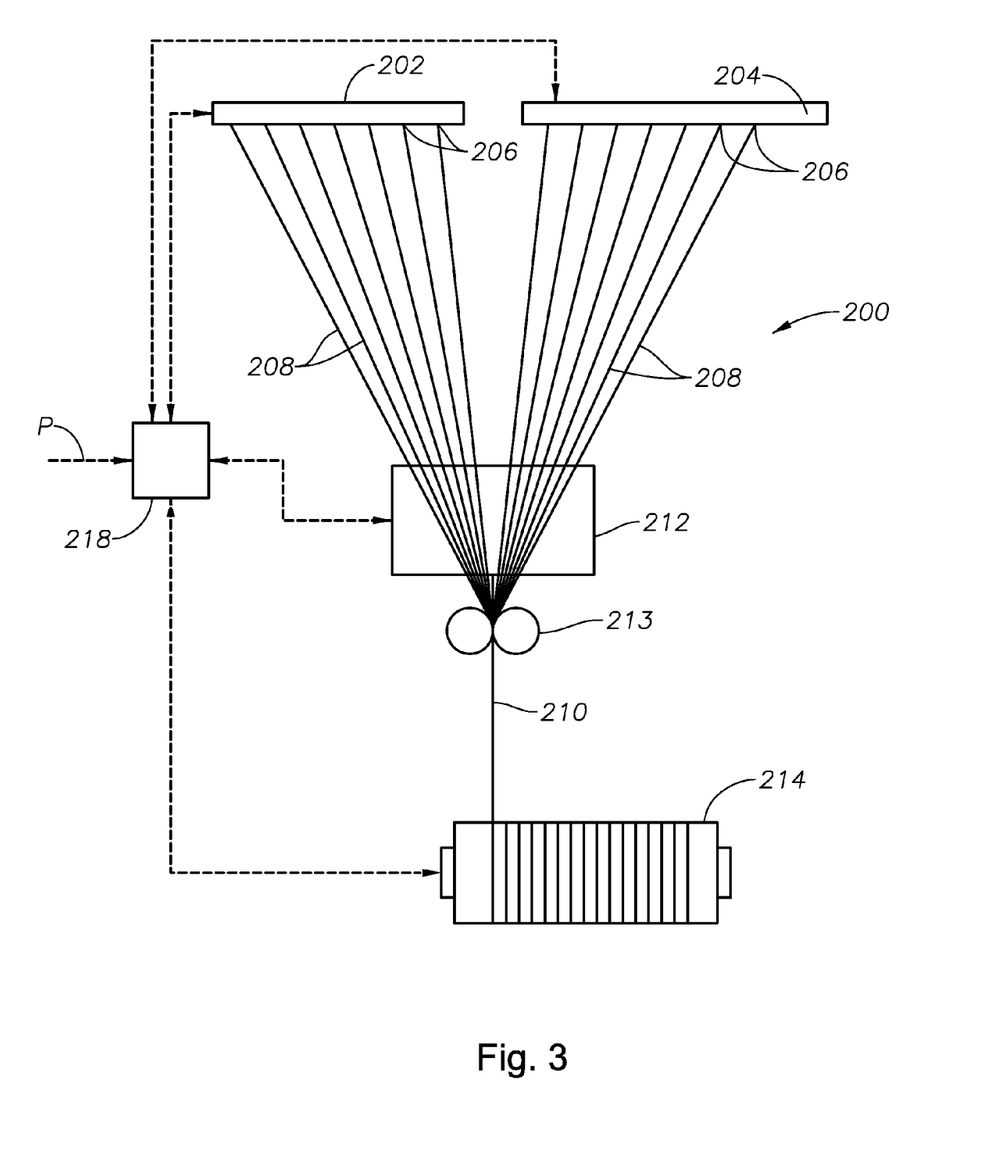

FIG. 3 is an illustration of a method and system 200 of making continuous fibers in accordance with the present disclosure. Several different processes may be used to form fibers, depending on the type of fiber. Textile fibers may be formed from molten glass directly from the furnace, or the molten glass may be fed first to a machine that forms glass marbles of about 0.62 inch (1.6 cm) in diameter, as alluded to herein. These marbles allow the glass to be inspected visually for impurities. In both the direct melt and marble melt process, the glass or glass marbles may be fed through electrically heated bushings (also called spinnerets) 202, 204. Bushing may be made of platinum or metal alloy, with anywhere from 200 to 3,000 very fine orifices 206. The molten glass passes through orifices 206 and comes out as fine filaments 208, as indicated schematically in FIG. 3. Multiple fine or primary filaments 208 may be collected into a product filament 210 by a fiber gatherer (in some embodiments binder applicator) 212 and rollers 213, and product filament 210 may be wound on a winder 214. A controller 218 may be used to control production of continuous fibers in embodiment 200 and similar embodiments. Controller 218 may receive a predicted value P from controller 48 of system and method embodiment 1 (FIG. 1), as well as signals representative of temperature of bushings 202, 204, pull rate of rollers 213, rate of winding of winder 214, and/or other parameters.

Figure 4:
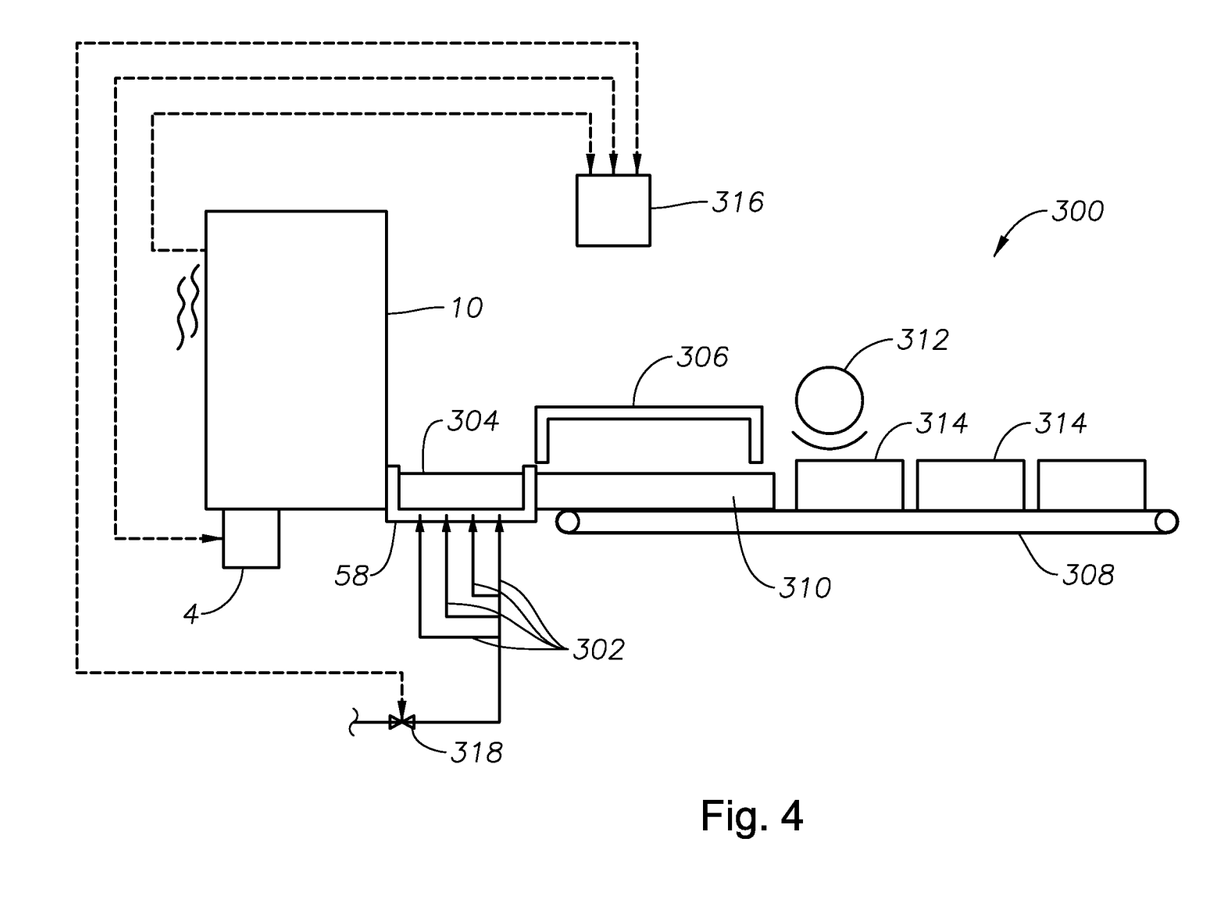
Figure 5:
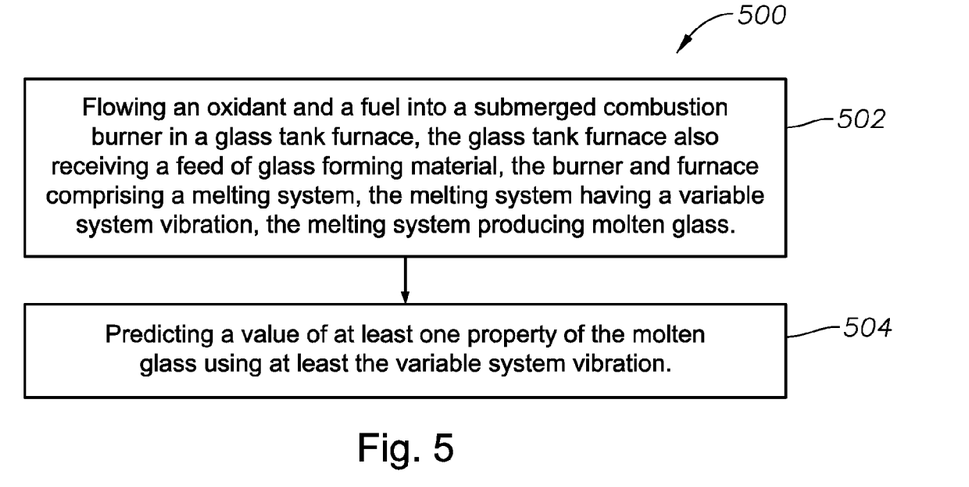
FIGS. 5, 6, 7 and 8 are logic diagrams of four methods in accordance with the present disclosure.

FIG. 4 illustrates another non-limiting system embodiment 300 in accordance with the present disclosure. In embodiment 300, initial foamy molten glass 304 from one or more submerged combustion melters 10 is discharged into one or more refractory or refractory-lined channels 58 where the bubble size in the molten glass is increased through means of additional air or other gaseous injection through one or more gas injectors 302, four being illustrated in this embodiment, to form a lower density, foamy molten glass through increased bubble size, and to control product density, bubble size, and gases contained within the bubbles. This lower density glass is discharged to a cooling and annealing lehr 306 on a conveyor 308 for thermal treatment into glass 310, and subsequent shaping into final products 314 of various shapes, for example by cutting equipment 312. Lehr 306 may not be necessary in all embodiments. In embodiment 300, a controller 316 may receive a sensed signal indicative of vibration and/or oscillation of melter 10, as well as other signals, such as oxidant and fuel flow rates to burner 4, flow of gas to refractory channel 58, level in melter 10, and so on. Controller 316 may calculate an actual or predicted value of a parameter of foamy melt 304 exiting melter 10, for example density, which value may be used to control the system and method, for example, amount of gas injected into the foamy melt using a valve 318 or other flow controller, burner fuel or oxidant flow rates, and the like.

Flow rates and composition of injected gas will depend upon the desired final foamed glass product density, and the flow rate of molten glass, but generally the flow rate of gas will range from about 0 to about 0.1 scf/lb. (0 to about 6250 cm³/kg) of molten glass product/injector, or from 0 to about 0.03 scf/lb. (0 to about 1875 cm³/kg) of molten glass product/injector. The number of and position of gas injectors 302 may vary, with lower number of injectors generally meaning their diameter would increase to deliver an equivalent amount of gas. Some of the injectors may be floor (bottom) mounted while some may be side-wall mounted, or all may be floor-mounted or all may be side-wall mounted. Gas injectors 302 may be positioned uniformly or non-uniformly. Flow of gas may be pulsed or non-pulsed. The flow rate of molten glass through channel 58 will in turn depend on the dimensions of channel 58, size of melter 10, temperature of the melt, viscosity of the melt, and like parameters, but in general the flow rate of molten glass in channel 58 may range from about 0.5 lb/min to over 5000 lbs/min (from about 0.23 kg/min to over 2300 kg/min), or from about 10 lbs/min to about 500 lbs/min (from about 4.5 kg/min to about 227 kg/min), or from about 100 lbs/min to 300 lbs/min (from about 45 kg/min to about 135 kg/min).

Temperature of the injected gas through gas injectors 302 is not critical, but higher temperature gases may increase the ability of the gas to disperse in the foamy molten glass and cause less heat loss in the system, while cooler gases may require that the melter and possibly the lehr use more energy in the melting and annealing steps. In certain embodiments the injected gas may actually be used to control cooling of the foamy molten glass.

Pressure of the injected gases is also not critical, except that the pressure at the tip of the gas injectors need be higher than the local pressure of the foamy molten glass in channel 58. Too high gas injection pressures may cause unnecessary and undesired "belching" of the foamy molten glass, while too low gas injection pressure may cause the gas to be held up by the foamy molten glass, or not enter the foamy molten glass in channel 58. In worse cases the foamy molten glass might enter the gas injectors, which is undesired.

Gas injectors 302 may simply be open-ended pipes protruding through the bottom, the sides, or both of channel 58, or may be specifically designed injectors, such as pipe-in-pipe designs having water-cooled injection tubes, nozzles, and the like. The injectors themselves may be straight, angled, or curved conduits, and they may inject gas perpendicular to the bottom or sidewalls of channel 58, or may inject gas at an angle to the bottom and/or sidewalls.

Channel 58 and gas injectors 302 may be made from stainless steel, ceramic material (for example zirconia and the like), or other heat-resistant material, and combinations thereof (for example ceramic inserts in stainless steel tubes). Channel 58 may have any lateral shape, such rectangular, oval, round, and the like. Depth of channel 58 may vary, but exemplary embodiments may have a depth that is commensurate with melter 10 depth, and such that the foamy molten glass will be able to move onto conveyor 308 and into lehr 306.

FIGS. 5, 6, 7, and 8 are logic diagrams of four method embodiments in accordance with the present disclosure. The method of embodiment 500 of FIG. 5 comprises flowing an oxidant and a fuel into a submerged combustion burner in a glass tank furnace, the glass tank furnace also receiving a feed of glass forming material, the burner and furnace comprising a melting system, the melting system having a variable system vibration, the melting system producing molten glass, box 502; and predicting a value of at least one property of the molten glass using at least the variable system vibration, box 504.

Figure 6:
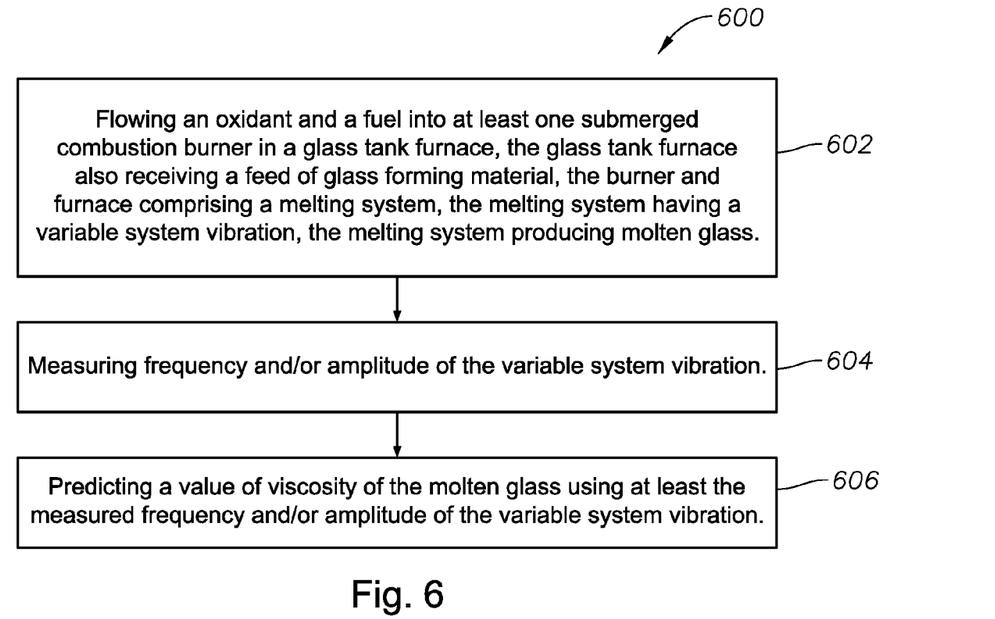

Another method of this disclosure is presented in the logic diagram of FIG. 6 as embodiment 600. Embodiment 600 is a method of producing molten glass, and comprises the steps of flowing an oxidant and a fuel into at least one submerged combustion burner in a glass tank furnace, the glass tank furnace also receiving a feed of glass forming material, the burner and furnace comprising a melting system, the melting system having a variable system vibration, the melting system producing molten glass, box 602. Method embodiment 600 then comprises measuring frequency and/or amplitude of the variable system vibration, box 604, then predicting a value of viscosity of the molten glass using at least the measured frequency and/or amplitude of the variable system vibration, box 606.

Figure 7:
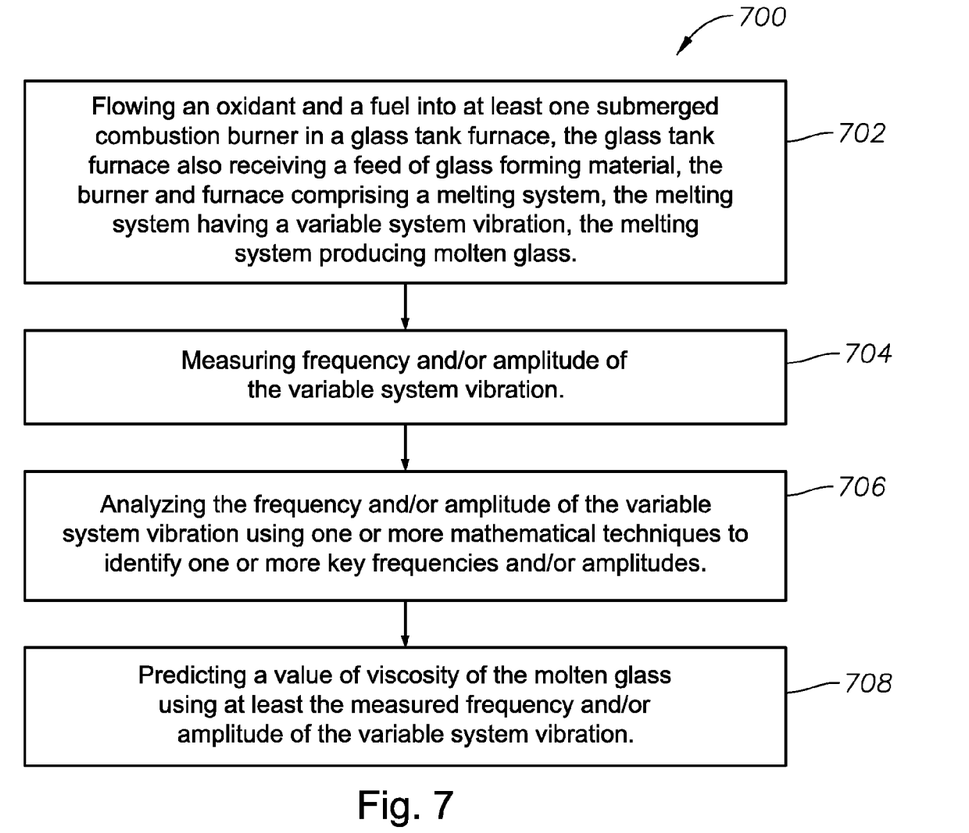

Yet another method of this disclosure is presented in the logic diagram of FIG. 7 as embodiment 700. Embodiment 700 is a method of producing molten glass, and comprises the steps of flowing an oxidant and a fuel into at least one submerged combustion burner in a glass tank furnace, the glass tank furnace also receiving a feed of glass forming material, the burner and furnace comprising a melting system, the melting system having a variable system vibration, the melting system producing molten glass, box 702. Method embodiment 700 then comprises measuring frequency and/or amplitude of the variable system vibration, box 704, then analyzing the frequency and/or amplitude of the variable system vibration using one or more mathematical techniques to identify one or more key frequencies and/or amplitudes, box 706. Method 700 then comprises predicting a value of viscosity of the molten glass using at least the measured frequency and/or amplitude of the variable system vibration, box 708.

Figure 8:
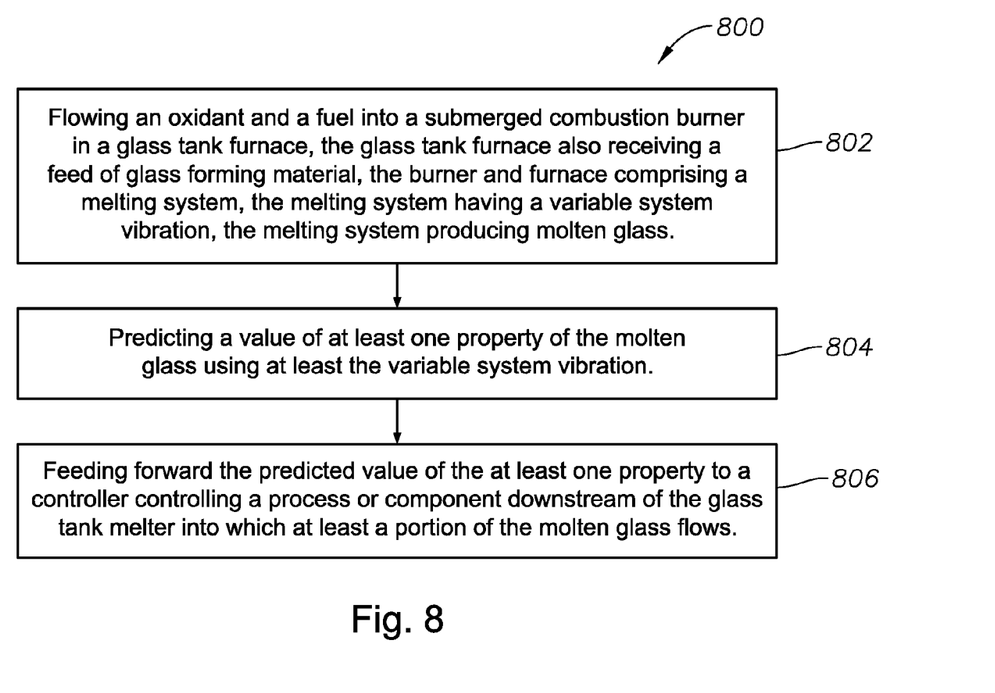

Another method of this disclosure is presented in the logic diagram of FIG. 8 as embodiment 800. Embodiment 800 is a method of producing molten glass, and comprises the steps of flowing an oxidant and a fuel into a submerged combustion burner in a glass tank furnace, the glass tank furnace also receiving a feed of glass forming material, the burner and furnace comprising a melting system, the melting system having a variable system vibration, the melting system producing molten glass, box 802, then predicting a value of at least one property of the molten glass using at least the variable system vibration, box 804. Method embodiment 800 includes feeding forward the predicted value of the at least one property to a controller controlling a process or component downstream of the glass tank melter for making glass objects, box 806. The process or component downstream of the glass tank melter may be selected from the group consisting of a continuous glass fiber production system, a staple fiber attenuation system, a system for producing shaped glass objects, or other downstream component, system or method. In certain embodiments the system for producing shaped glass objects may comprise a system for producing foamed glass objects.

In operation of burners of the disclosure, in exemplary embodiments oxidant may be fed to the primary annulus, and a fuel to the longitudinal bore of the first conduit. In inorganic glass-forming material is charged to the melter. The mass flow rate of the inorganic material, for example glass, is a function of the composition of the feed material, desired composition, viscosity, and temperature of the molten glass, the flame temperature of the burner(s), the burner geometry, for example burner exit, nozzle exit, and non-central passages sizes, the pressure in the mixing region of the burner, and other parameters. The process operating conditions are generally not independent values but have some degree of interaction. Oxygen-enhanced oxidant/fuel melting is markedly different than the traditional air-fuel melting processes. The general principle is to operate combustion in the mixing region of the burner in a manner that replaces some of the air with a separate source of oxygen. The overall combustion ratio may not change. The process of combining fuel and oxygen-enriched oxidant will, in most embodiments, primarily occur in the mixing region, after the gases have passed over a flame arrestor safety device. Varying the oxygen content of the oxidant can control the flame temperature of the combustion gases.

The total quantities of fuel and oxidant used by submerged combustion burners useful in methods and systems of the present disclosure may be such that the flow of oxygen may range from about 0.9 to about 1.2 of the theoretical stoichiometric flow of oxygen necessary to obtain the complete combustion of the fuel flow. Another expression of this statement is that the combustion ratio may range from about 0.9 to about 1.2.

The velocity of the fuel in the burners of various method and system embodiments of the present disclosure depends on the burner geometry used, but generally is at least about 15 meters/second (m/s). The upper limit of fuel velocity depends primarily on the desired penetration of flame and/or combustion products into the glass melt and the geometry of the burner and melter; if the fuel velocity is too low, the flame temperature may be too low, providing inadequate temperature in the melter, which is not desired, and if the fuel flow is too high, flame and/or combustion products might impinge on a melter wall or roof, or cause carryover of melt into the exhaust, or be wasted, which is also not desired. Similarly, oxidant velocity should be monitored so that flame and/or combustion products do not impinge on a melter wall or roof, or cause carryover of melt into the exhaust, or be wasted. Oxidant velocities depend on fuel flow rate and fuel velocity, but in general should not exceed about 200 ft/sec at 400 scfh flow rate.

Additionally, burners useful in methods and system embodiments of this disclosure may also be provided with stabilization of the flame with an auxiliary injection of fuel and/or oxidant gases. For example, a portion of the oxidant may be premixed with fuel as a primary oxidant, usually air, in addition to a secondary oxidant injection.

Conduits, submerged combustion melter, luers, forehearths, channels, burners and the like useful in methods of the present disclosure may be comprised of metal, ceramic, ceramic-lined metal, or combination thereof. Suitable metals include stainless steels, for example, but not limited to, 306, 316, as well as titanium alloys, aluminum alloys, and the like. High-strength materials like C-110 and C-125 metallurgies that are NACE qualified may be employed. (As used herein, "NACE" refers to the corrosion prevention organization formerly known as the National Association of Corrosion Engineers, now operating under the name NACE International, Houston, Tex.) Use of high strength steel and other high strength materials may significantly reduce the wall thickness required, reducing weight for example of burners and melter walls. Threaded connections may eliminate the need for $3^{rd}$ party forgings and expensive welding processes—considerably improving system delivery time and overall cost. It will be understood, however, that the use of $3^{rd}$ party forgings and welding is not ruled out for certain burners useful in the methods described herein, and may actually be preferable in certain situations.

If ceramic materials are used, suitable materials may include fused zirconia ($ZrO_2$), fused cast AZS (alumina-zirconia-silica), rebonded AZS, or fused cast alumina ($Al_2O_3$). The choice of a particular material is dictated among other parameters by the chemistry, pressure, and temperature of fuel and oxidant used and type of glass melt to be produced.

The skilled artisan, having knowledge of the particular application, pressures, temperatures, vibrations, and available materials, will be able design the most cost effective, safe, and operable system components for each particular application without undue experimentation.

One or more control strategies may be employed, as long as the strategy includes measurement of melter system vibration and/or oscillation and those measurements (or values derived from those measurements) are used in predicting a melt property and/or controlling the melter system and/or controlling a downstream component or process. A combustion process control scheme may be employed, for example in conjunction with burner controllers 34, 36. A master controller may be employed, such as controller 48, but the disclosure is not so limited, as any combination of controllers could be used. Programmable logic controllers (PLCs) may be used.

Control strategies may be selected from proportional-integral (PI), proportional-integral-derivative (PID) (including any known or reasonably foreseeable variations of these), and may compute a residual equal to a difference between a measured value and a set point to produce an output to one or more control elements. The controller may compute the residual continuously or non-continuously. Other possible implementations of the disclosure are those wherein the controller comprises more specialized control strategies, such as strategies selected from feed forward, cascade control, internal feedback loops, model predictive control, neural networks, and Kalman filtering techniques.

Figure 9A:
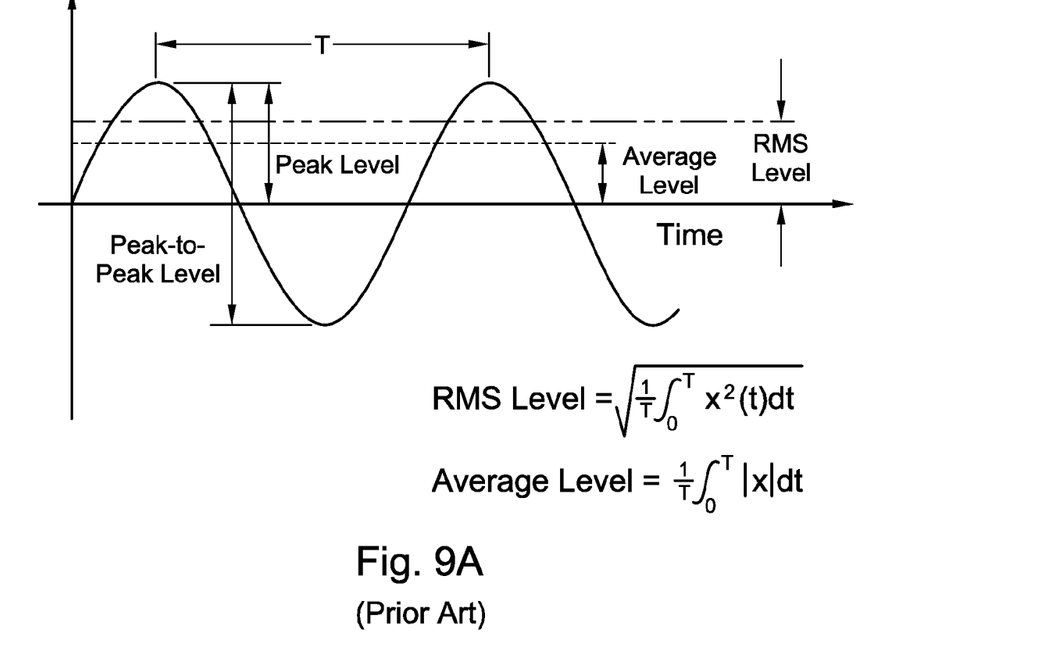
FIGS. 9A and 9B are prior art schematic representations of vibration that may be useful in understanding aspects of the present disclosure.
Figure 9B:
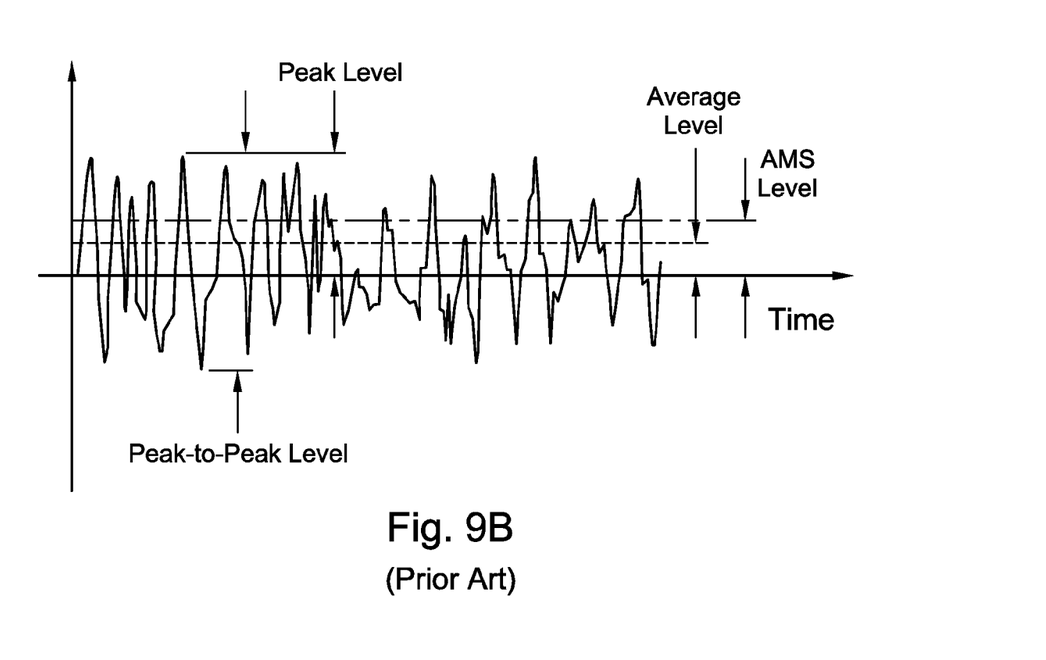

Measurement of vibration is a well-developed science in its own right and requires little explanation to the skilled vibration sensor artisan. A good summary is provided by Furman, B. J., "*Vibration Measurement*", San Jose State University, Department of Mechanical and Aerospace Engineering, pp. 1-14, 22 Nov. 2005, incorporated herein by reference. Furman described vibration as interchange between potential and kinetic energy in bodies with finite stiffness and mass that arises from time dependent energy input, and gives examples, including fluid flow. Without being limited to any particular theory, the inventors herein theorize that the oxidant and/or fuel fluid flows through submerged combustion burners, and the flames and combustion products emanating from those burners, contribute to the vibration and/or oscillation observed in submerged combustion glass tank furnaces. Basic parameters of vibration study, such as amplitude, amplitude peak level, peak-to-peak amplitude, root-mean-square (RMS) amplitude level, and average (rectified) amplitude, are given schematically in FIG. 9A for a sinusoidal vibration, and in FIG. 9B for a more typical industrial vibration, from Furman.

Furman also summarizes vibration measurement transducers that may be useful in methods and systems of the present disclosure, for example, displacement-based sensors, velocity-based sensors, and acceleration-based sensors. Other sensors may be used. Examples of displacement-based sensors include linear variable differential transformer (LVDT) sensors, Eddy current sensors, capacitive sensors, and Hall sensors. Examples of velocity-based sensors include geophones and laser Doppler vibrometers. Examples of acceleration-based vibration sensors, perhaps more commonly referred to simply as accelerometers, include piezoelectric accelerometers, microelectromechanical systems (MEMS) accelerometers, and thermal accelerometers.

Sensors may be provided for burner controllers for the following parameters, which are merely exemplary examples: $V_{fuel}$, velocity of fuel entering burner; $V_{PO}$, velocity of primary oxidant entering burner; $V_{SO}$, velocity of secondary oxidant entering burner; $M_{fuel}$, mass flow rate of fuel entering burner; $M_{PO}$, mass flow rate of primary oxidant entering burner; $T_{fuel}$, temperature of fuel entering burner; $T_{PO}$, temperature of primary oxidant entering burner; $P_{PO}$, pressure of primary oxidant entering burner; $H_{PO}$, humidity of primary oxidant. Outputs may be provided for the following parameters, which are merely exemplary: $V_{fuel}$, velocity of fuel entering burner; $V_{PO}$, velocity of primary oxidant entering burner; $M_{fuel}$, mass flow rate of fuel entering burner; $M_{SO}$, mass flow rate of secondary oxidant entering burner; $T_{fuel}$, temperature of fuel entering burner; $T_{PO}$, temperature of primary oxidant entering burner; $P_{SO}$, pressure of secondary oxidant entering burner; $M_{EFF}$ (or $M_{HTF}$), mass flow rate of hot effluent (or heat transfer fluid). Other parameters may be included as inputs, such as burner geometry, melter geometry, combustion ratio, melt viscosity, and the like.

Mathematical treatment of vibration and/or oscillation data, or any data collected as described herein, is straightforward. Transforms, such as Fourier and Inverse Fourier transforms, Laplace and Inverse Laplace transforms, Z-transforms and inverse Z-transforms, are known and explained in various textbooks and on the Internet. For example, see MathWorks.com. Any one or more of these mathematical treatments may be used to identify key frequencies, amplitudes, and the like.

An example of an equation that might be analyzed and used for predicting melt viscosity is Equation (1):

$$\eta = f(T, \omega, u, P, R) \tag{1}$$

where: $\eta$=melt viscosity, T=melt temperature, h=depth of glass in the melter, $\omega$=frequency of vibration and/or oscillation of the melter, u=amplitude of vibration and/or oscillation of the melter, P=pressure in the melter, and R=melt flow rate from the melter. Non-limiting examples of other equations might be Equations 2-6:

$$\eta = f(T, \omega, u, P, R, V_{fuel}, V_{PO}, M_{fuel}, M_{PO}) \tag{2}$$

$$\eta = f(T, h, \omega, P, R, V_{fuel}, V_{PO}, M_{fuel}, M_{PO}) \tag{3}$$

$$\eta = f(T, h, \omega, u, P, R, \text{melter geometry}) \tag{4}$$

$$\eta = f(T, h, \omega, u, P, R, \text{burner geometry}) \tag{5}$$

$$\rho = f(T, \omega, u, P, R) \tag{6}$$

where $\rho$ is density of the melt. More than one equation may be employed, depending on the specific situation.

The term "control", used as a transitive verb, means to verify or regulate by comparing with a standard or desired value. Control may be closed loop, feedback, feed-forward, cascade, model predictive, adaptive, heuristic and combinations thereof. The term "controller" means a device at least capable of accepting input from sensors and meters in real time or near-real time, and sending commands directly to burner control elements, and/or to local devices associated with burner control elements able to accept commands. A controller may also be capable of accepting input from human operators; accessing databases, such as relational databases; sending data to and accessing data in databases, data warehouses or data marts; and sending information to and accepting input from a display device readable by a human. A controller may also interface with or have integrated therewith one or more software application modules, and may supervise interaction between databases and one or more software application modules.

The phrase "PID controller" means a controller using proportional, integral, and derivative features. In some cases the derivative mode may not be used or its influence reduced significantly so that the controller may be deemed a PI controller. It will also be recognized by those of skill in the control art that there are existing variations of PI and PID controllers, depending on how the discretization is performed. These known and foreseeable variations of PI, PID and other controllers are considered within the disclosure.

The controller may utilize Model Predictive Control (MPC). MPC is an advanced multivariable control method for use in multiple input/multiple output (MIMO) systems. MPC computes a sequence of manipulated variable adjustments in order to optimise the future behavior of the process in question. At each control time k, MPC solves a dynamic optimization problem using a model of the controlled system, so as to optimize future behavior (at time k+1, k+2 . . . k+n) over a prediction horizon n. This is again performed at time k+1, k+2 . . . . MPC may use any derived objective function, such as Quadratic Performance Objective, and the like, including weighting functions of manipulated variables and measurements. Dynamics of the process and/or system to be controlled are described in an explicit model of the process and/or system, which may be obtained for example by mathematical modeling, or estimated from test data of the real process and/or system. Some techniques to determine some of the dynamics of the system and/or process to be controlled include step response models, impulse response models, and other linear or non-linear models. Often an accurate model is not necessary. Input and output constraints may be included in the problem formulation so that future constraint violations are anticipated and prevented, such as hard constraints, soft constraints, set point constraints, funnel constraints, return on capital constraints, and the like. It may be difficult to explicitly state stability of an MPC control scheme, and in certain embodiments of the present disclosure it may be necessary to use nonlinear MPC. In so-called advanced control of various systems, PID control may be used on strong mono-variable loops with few or nonproblematic interactions, while one or more networks of MPC might be used, or other multivariable control structures, for strong interconnected loops. Furthermore, computing time considerations may be a limiting factor. Some embodiments may employ nonlinear MPC.

A feed forward algorithm, if used, will in the most general sense be task specific, meaning that it will be specially designed to the task it is designed to solve. This specific design might be difficult to design, but a lot is gained by using a more general algorithm, such as a first or second order filter with a given gain and time constants.

Although only a few exemplary embodiments of this disclosure have been described in detail above, those skilled in the art will readily appreciate that many modifications are possible in the exemplary embodiments without materially departing from the novel teachings and advantages of this disclosure. Accordingly, all such modifications are intended to be included within the scope of this disclosure as defined in the following claims. In the claims, no clauses are intended to be in the means-plus-function format allowed by 35 U.S.C. §112, paragraph 6 unless "means for" is explicitly recited together with an associated function. "Means for" clauses are intended to cover the structures described herein as performing the recited function and not only structural equivalents, but also equivalent structures.

What is claimed is:

1. A method including feeding glass forming material into a melter, flowing an oxidant and a fuel into a submerged combustion burner positioned in the melter, flowing an oxidant and a fuel into a submerged combustion burner positioned in the melter, the burner and melter defining a submerged combustion glass melting system producing molten glass, at least the melter having a variable vibration, the method comprising:
   a) measuring frequency and/or amplitude of the variable vibration of the melter; and
   b) predicting a value of viscosity of the molten glass using the measured frequency and/or amplitude of the variable vibration.

2. The method of claim 1 comprising measuring at least one other system property selected from the group consisting of flow rate of oxidant, flow rate of fuel, flow rate of glass forming material, flow rate of molten glass, glass tank furnace pressure, height or depth of molten glass in the glass tank furnace, and combinations thereof.

3. The method of claim 1 comprising analyzing the frequency and/or amplitude of the variable vibration using one or more mathematical techniques to identity one or more key frequencies and/or amplitudes.

4. A method of producing molten glass using submerged combustion, including feeding glass forming material into a melter, flowing an oxidant and a fuel a submerged combustion burner positioned in the melter, the burner and melter defining a submerged combustion glass melting system producing molten glass, at least the melter having a variable vibration, the method comprising:
   a) measuring frequency and/or amplitude of the variable vibration; and
   b) predicting a value of viscosity of the molten glass using at least the measured frequency and/or amplitude of the variable vibration.

5. The method of claim 4 wherein the predicting comprises using, to mathematical technique selected from the group consisting of linear regression, non-linear modeling, and neural net modeling.

6. The method of claim 4 comprising analyzing the frequency and/or amplitude of the variable vibration using one or more mathematical techniques to identify one or more key frequencies and/or amplitudes.

7. The method of claim 6 wherein the mathematical technique is selected from the group consisting of linear regression, non-linear modeling, and neural net modeling.

8. A method of producing molten glass using submerged combustion, including feeding glass forming material into a melter, flowing an oxidant and a fuel into a submerged combustion burner positioned in the melter, the burner and melter defining a submerged combustion glass melting system producing molten glass, at least the melter having a variable vibration, the method comprising:
   a) measuring frequency and/or amplitude of the variable vibration of the melter; and
   b) analyzing the frequency and/or amplitude of the variable system vibration using one or more mathematical techniques to identify one or more key frequencies and/or amplitudes; and
   c) predicting a value of viscosity of the molten glass using the measured frequency and/or amplitude of the variable vibration.

9. A method of making glass objects using submerged combustion, including feeding glass forming material into a melter, flowing an oxidant and a fuel into a submerged combustion burner positioned in the melter, the burner and melter defining a submerged combustion glass melting system producing molten glass, at least the melter having a variable vibration, the method comprising:
   a) measuring frequency and/or amplitude of the variable vibration of the melter; and
   b) predicting a value of viscosity of the molten glass using the measured frequency and/or amplitude of the variable vibration; and
   c) feeding forward the predicted value of the viscosity to a controller controlling a process or component downstream of the melter for making glass objects.

* * * * *